United States Patent [19]

Homma et al.

[11] Patent Number: 5,336,703

[45] Date of Patent: Aug. 9, 1994

[54] TWO PACK TYPE CURABLE COMPOSITION COMPRISING EPOXY RESIN AND SILICON-CONTAINING ELASTOMERIC POLYMER

[75] Inventors: Michihide Homma, Takasago; Atsuko Yoshihara, Kobe; Hiroshi Wakabayashi, Kobe; Katsuhiko Isayama, Kobe, all of Japan

[73] Assignee: Kanegafuchi Chemical Industry Co., Ltd., Osaka, Japan

[21] Appl. No.: 119,823

[22] Filed: Sep. 13, 1993

Related U.S. Application Data

[63] Continuation of Ser. No. 441,150, Nov. 27, 1989, abandoned.

[30] Foreign Application Priority Data

Nov. 25, 1988 [JP] Japan ................................. 63-299088
Nov. 25, 1988 [JP] Japan ................................. 63-299089

[51] Int. Cl.$^5$ ........................................... C08L 63/00
[52] U.S. Cl. .................................... 523/435; 523/457; 523/458; 523/455
[58] Field of Search ................ 523/435, 455, 457, 458

[56] References Cited

U.S. PATENT DOCUMENTS

4,657,986  4/1987  Isayama et al. ................. 525/407
4,837,274  6/1989  Kawakubo et al. .............. 525/100

FOREIGN PATENT DOCUMENTS

0218228  4/1987  European Pat. Off. ..
0370463  5/1990  European Pat. Off. ..

OTHER PUBLICATIONS

Patent Abstracts of Japan, vol. 10, No. 208, JP-A-61 47724, Jul. 22, 1986.
Patent Abstracts of Japan, vol. 22, JP-B-52 141899, Nov. 26, 1977.

*Primary Examiner*—Ralph H. Dean
*Attorney, Agent, or Firm*—Wegner, Cantor, Mueller & Player

[57] ABSTRACT

A two-pack type curable composition comprising:

A. a first composition containing (A-1) an organic elastomeric polymer having at least one silicon-containing group to the silicon atom of which a hydroxyl group and/or a hydrolyzable group are bonded and which is cross linkable through formation of a siloxane linkage in a molecule and (A-2) a curing agent for an epoxy resin, and B. a second composition containing (B-1) an epoxy resin, (B-2) a curing catalyst for the organic elastomeric polymer having at least one silicon-containing reactive group and (B-3) at least one member selected from the group consisting of acidic fillers and carboxylic acids, which has good storage stability.

11 Claims, No Drawings

TWO PACK TYPE CURABLE COMPOSITION COMPRISING EPOXY RESIN AND SILICON-CONTAINING ELASTOMERIC POLYMER

This application is a continuation of U.S. application Ser. No. 07/441,150 filed Nov. 27, 1989 now abandoned.

BACKGROUND OF THE INVENTION

Field of the Invention

The present invention relates to a two-pack type curable composition comprising an epoxy resin and an organic elastomeric polymer having at least one silicon-containing group to the silicon atom of which a hydroxyl group and/or a hydrolyzable group are bonded and which is cross linkable through formation of a siloxane linkage (hereinafter referred to as "silicon-containing reactive group) in a molecule.

Description of the Related Art

Hitherto, there is known a curable composition comprising an epoxy resin and an organic elastomeric polymer having at least one silicon-containing reactive group in a molecule, and such composition is used, for example, as an adhesive (cf. U.S. Pat. No. 4,657,986).

When such composition is formulated in the form of a two-pack type curable composition and one pack contains the epoxy resin and a curing agent for the organic elastomeric polymer having the silicon-containing reactive group and the other contains the organic elastomeric polymer having the silicon-containing reactive group, the composition has a deteriorated curing rate after storage since the pack containing the epoxy resin and the curing agent for the organic elastomeric polymer having the silicon-containing reactive group has poor storage stability. Such deterioration of the curing rate is remarkable when a filler, particularly an inorganic filler, is contained in the pack comprising the epoxy resin.

SUMMARY OF THE INVENTION

An object of the present invention is to provide a two pack type curable composition comprising an epoxy resin and an organic elastomeric polymer having a silicon-containing reactive group which composition has improved storage stability and then suffers no or little decrease of the curing rate.

Accordingly, the present invention provides a two-pack type curable composition comprising:

A. a first composition containing (A-1) an organic elastomeric polymer having at least one silicon-containing reactive group in a molecule and (A-2) a curing agent for an epoxy resin, and B. a second composition containing (B-1) an epoxy resin, (B-2) a curing catalyst for the organic elastomeric polymer having at least one silicon-containing reactive group and (B-3) at least one member selected from the group consisting of acidic fillers and carboxylic acids.

DETAILED DESCRIPTION OF THE INVENTION

Specific examples of a backbone of the organic elastomeric polymer having at least one silicon-containing reactive group in a molecule (A-1) are polyethers prepared by ring opening polymerization of cyclic ethers (e.g. propylene oxide, ethylene oxide, tetrahydrofuran and the like); polyesters prepared by polycondensation of a dibasic acid (e.g. adipic acid) and glycol or ring opening polymerization of lactones; ethylene/propylene copolymers; polyisobutylene and copolymers of isobutylene with isoprene and the like; polychloroprene; polyisoprene and copolymers of isoprene with butadiene, styrene, acrylonitrile and the like; polybutadiene and copolymers of butadiene with styrene, acrylo-nitrile and the like; polyolefins prepared by hydrogenating polyisoprene, polybutadiene or isoprene/butadiene copolymers; polyacrylates prepared by radical polymerization of acrylate (e.g. ethyl acrylate, butyl acrylate and the like) and copolymers of acrylate with vinyl acetate, acrylonitrile, styrene, ethylene and the like; graft polymers prepared by polymerizing a vinyl monomer in the organic elastomeric polymer which is used in the present invention; polysulfides; and the like. Among them, preferable are polyethers comprising repeating units of the formula: —R—O— wherein R is a $C_2$-$C_4$ alkylene group (e.g. polypropylene oxide and the like); graft polymers prepared by polymerizing a vinyl monomer (e.g. acrylate, styrene, acryionitrile, vinyl acetate and the like) in the presence of polyether (e.g. polypropylene oxide and the like); polyalkyl acrylate or copolymers of at least 50% by weight of alkyl acrylate with vinyl acetate, acrylonitrile, styrene, ethylene and the like, since the silicon-containing reactive group is easily introduced at a chain end of the molecule of these polymers and they are suitable for the preparation of a liquid polymer in the absence of a solvent.

Typically, the silicon-containing reactive group is represented by the formula:

wherein X is a hydroxyl group or a hydrolyzable group, $R^1$ is a monovalent hydrocarbon group having 1 to 20 carbon atoms or a triorganosiloxy group of the formula: $R^2{}_3$—Si—O— in which $R^2$ is a monovalent hydrocarbon group having 1 to 20 carbon atoms, "a" is 0, 1, 2 or 3, "b" is 0, 1 or 2 provided that the total of "a" and "b" is at least 1, preferably from 1 to 4, and "m" is 0 or an integer of 1 to 19, provided that when two or more $R^1$ groups are present, they may be the same or different, that when two or more X moieties are present, they may be the same or different, that when two or more bracketed groups are present, they may be the same or different, and "b" may be the same or different when "m" is two or more.

When X is the hydrolyzable group, the group (I) is cross linked through hydrolysis with water and a silanol condensation reaction in the presence or absence of a catalyst for the silanol condensation. When X is the hydroxyl group, the group (I) is cross linked through the silanol condensation reaction in the presence or absence of a catalyst for the silanol condensation.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the hydrogen atom, the alkoxy group, the acyloxy group, the ketoximate group, the amino group, the amide group, the aminoxy group, the mercapto group and the alkenyloxy group are preferable. More preferable is the alkoxy group since it is mildly hydrolyzed and easily handled.

One, two or three hydrolyzable groups or hydroxyl groups may be bonded to one silicon atoms. The sum of "a" and "b" is preferably from 1 to 5. When two or more hydrolyzable groups or hydroxyl groups are present in one silicon-containing reactive group, they may be the same or different.

The silicon-containing reactive group has at least one silicon atom. When the silicon atoms are bonded through siloxane linkages, the silicon-containing reactive group preferably has not more than 20 silicon atoms.

Among the silicon-containing reactive group (I), a group of the formula:

$$-\underset{\underset{X_c}{|}}{Si}-X_c \quad (II)$$

wherein $R^1$ and $X$ are the same as defined above, and "c" is 1, 2 or 3 is preferable because of easy availability.

Specific examples of the hydrocarbon group having 1 to 20 carbon atoms for the group $R^1$ in the formula (I) are alkyl groups having 1 to 20 carbon atoms, aryl group having 6 to 20 carbon atoms, aralkyl groups having 7 to 20 carbon atoms and the like. More concrete examples of these groups are alkyl groups (e.g. methyl or ethyl), cycloalkyl groups (e.g cyclohexyl), aryl groups (e.g. phenyl) and aralkyl groups (e.g. benzyl). As the triorganosiloxy group, a group of the formula: $R^2{}_3-Si-O-$ in which $R^2$ is is a methyl group and a phenyl group is preferable. Among them, the methyl group is most preferable.

The silicon-containing reactive group chemically bonds to the backbone chain of the organic elastomeric polymet. It is not preferable for the silicon-containing reactive group to be bonded to the backbone chain through a bond structure of the formula: $\equiv Si-O-C\equiv$, since such structure tends to be cleaved with water. A preferable bonding structure between the silicon atom of the reactive group and the backbone chain is, for example, a structure of the formula: $\equiv Si-C\equiv$.

The organic elastomeric polymer has at least one, preferably 1.2 to 6 silicon-containing reactive groups in a molecule on the average. When the number of the silicon-containing reactive groups in a molecule is less than one on the average, the composition of the invention is not effectively cured and the improvement of the properties is not satisfactorily achieved.

Preferably, the silicon-containing reactive group is attached to the chain end of the organic polymer molecule, because the terminal silicon-containing reactive group elongates the chain length between the adjacent cross linking sites in the cured product, so that the rubbery elasticity is easily achieved, brittleness of the epoxy resin is more effectively improved, and the elastomeric cured product has better strength.

The silicon-containing reactive group may be introduced in the organic elastomeric polymer by following manners:

(1) Copolymerizing a monomer having a copolymerizable unsaturated bond and the silicon-containing reactive group (e.g. vinyltrialkoxysilane, methacryloyloxypropyimethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e g. γ-glycidoxypropyltrimethoxysilane, γ-glyci-doxy-propylmethyldimethoxysilane and the like) with propylene oxide or ethylene oxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azo-bis-2-(8-methyldiethoxysilyl-2-cyanohexane) and the like).

By the manners (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

Specific examples of the reaction (4) are shown in following Table.

TABLE 1

| Functional group Y | Functional group Y' | Resulting bond |
|---|---|---|
| —COOH | HO— | —COO— |
| ↑ | CH$_2$——CH— \\ \\O/ | —COOCH$_2$CH— \| OH |
| ↑ | H$_2$N— | COO$^-$H$_3\overset{+}{N}$— or —CONH— |
| ↑ | OCN— | —COOCONH— |
| ↑ | CH$_2$=CHCOO— | —COOCH$_2$CH$_2$COO— |
| —OH | OCN— | —OCONH— |

TABLE 1-continued

| Functional group Y | Functional group Y' | Resulting bond |
|---|---|---|
| —SH | $\mathrm{CH_2\!-\!\!\!-\!\!\!-CH\!-}$ $\underset{O}{\diagdown\;\diagup}$ | $\mathrm{-SCH_2CH-}$ $\quad\;\;\;\mid$ $\quad\;\;\;\mathrm{OH}$ |
| ↑ | OCN— | —SCONH— |
| ↑ | $\mathrm{CH_2\!=\!CHCOO-}$ | $\mathrm{-SCH_2CH_2COO-}$ |
| ↑ | $\mathrm{CH_2\!=\!CH-}$ | $\mathrm{-SCH_2CH_2-}$ |
| ↑ | $\mathrm{ClCH_2-}$ | $\mathrm{-SCH_2-}$ |
| $\mathrm{-CH\!-\!\!\!-\!\!\!-CH_2}$ $\;\;\;\underset{O}{\diagdown\;\diagup}$ | HOOC— | $\mathrm{-CHCH_2OCO-}$ $\;\mid$ $\;\mathrm{OH}$ |
| ↑ | HS— | $\mathrm{-CHCH_2S-}$ $\;\mid$ $\;\mathrm{OH}$ |
| ↑ | $\mathrm{H_2N-}$ | $\mathrm{-CHCH_2NH-}$ $\;\mid$ $\;\mathrm{OH}$ |
| ↑ | HO— | $\mathrm{-CHCH_2O-}$ $\;\mid$ $\;\mathrm{OH}$ |
| —NH$_2$ | $\mathrm{CH_2\!-\!\!\!-\!\!\!-CH\!-}$ $\underset{O}{\diagdown\;\diagup}$ | $\mathrm{-NHCH_2\!-\!CH-}$ $\qquad\quad\;\mid$ $\qquad\quad\;\mathrm{OH}$ |
| ↑ | OCN— | —NHCONH— |
| ↑ | HOOC— | $\mathrm{-\overset{+}{N}H_3O^-CO-}$ or —NHCO— |
| ↑ | $\mathrm{ClCH_2-}$ | $\mathrm{-\overset{+}{N}H_2CH_2-}$ $\quad\;\mid$ $\quad\;\mathrm{Cl}^-$ |
| ↑ | $\mathrm{CH_2\!=\!CHCOO-}$ | $\mathrm{-NHCH_2CH_2COO-}$ |
| —CONH$_2$ | OCN— | —CONHCONH— |
| —CH=CH$_2$ | HS— | —CH$_2$CH$_2$S— |
| ↑ | H—Si≡ | —CH$_2$CH$_2$Si≡ |
| —NCO | HOOC— | —NHCOOCO— |
| ↑ | HO— | —NHCOO— |
| ↑ | HS— | —NHCOS— |
| ↑ | H$_2$N— | —NHCONH— |

TABLE 1-continued

| Functional group Y | Functional group Y' | Resulting bond |
|---|---|---|
| 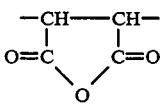 | HO— | 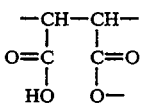 |
|  | H$_2$N— | 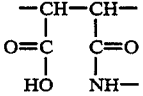 |

Specific examples of the polymer having the functional group Y are polyetherpolyols comprising repeating units of the formula: —R—O— wherein R is a C$_2$-C$_4$ alkylene group (e.g. polyoxypropylenepolyol, polyoxyethylenepolyol, polyoxytetramethylenediol and the like); polyesterpolyols prepared by polycondensation of a dibasic acid (e.g. adipic acid) and glycol or ring opening polymerization of lactones; polyols or polycarboxylic acids of polyisobutylene; polyols or polycarboxylic acids of polybutadiene or copolymers of butadiene with styrene, acrylonitrile and the like; polyols of polyolefins prepared by hydrogenating polyisoprene or polybutadiene; polymer having an isocyanate functional group prepared by reacting the above polyols or polycarboxylic acids with polyisocyanate; polymers having an ethylenically unsaturated bond prepared by reacting the above polyols with a halogen-containing ethylenically unsaturated compound, and the like. Among them, preferable are those having the functional group Y at the chain end of the molecule.

Specific examples of the silicon-containing compound having the functional group Y' are amino group-containing silanes (e.g. γ-(2-aminoethyl)aminopropyl-trimethoxy-silane, γ-(2-aminoethyl)aminopropylmethyldimethoxysilane, γ-aminopropyltriethoxysilane and the like); mercapto group-containing silanes (e.g. γ-mercaptopropyltrimethoxysilane, γ-mercaptopropylmethyldimethoxysilane and the like); epoxysilanes (e.g. γ-glycidoxypropyltrimethoxysilane, β-(3,4-epoxycyclohexyl)ethyltrimethoxysilane and the like); ethylenically unsaturated silanes (e.g. vinyltriethoxysilane, γ-methacryloyloxypropyltrimethoxysilane, γ-acryloyloxypropylmethyldimethoxysilane and the like); chlorine-containing silanes (e.g. γ-chloropropyltrimethoxysilane and the like); isocyanate-containing silanes (e.g. γ-isocyanate-propyltriethoxysilane, γ-isocyanatepropylmethyldimethoxy-silane and the like ); and hydrosilanes (e.g. methyldimethoxysilane, trimethoxysilane, methyldiethoxysilane and the like.

Among the combinations of the polymer having the functional group Y and the compound having the functional group Y', (i) a combination of the polymer having an isocyahate group and the amino group- or mercapto group-containing silane and (ii) a combination of the polymer having an ethylenically unsaturated group and the hydrosilane are preferable. Among the combination (ii) , a combination of polypropyleneoxide having an allylether group at the chain end and the hydrosilane is particularly preferable. In the combination (ii), a silyl group can be introduced in the polymer by a hydrosilylation reaction between a vinyl group and a hydrosilyl group in the presence of a platinum catalyst.

The molecular weight of the organic polymer having the silicon-containing reactive group is usually from 500 to 50,000, preferably from 1,000 to 20,000 since in this molecular weight range, the polymer is in a liquid state.

The organic elastomeric polymers may be used independently or as a mixture thereof.

Preferable examples of the organic polymer having the silicon-containing reactive group are disclosed in U.S. Pat. Nos. 3,408,321, 3,453,230 and 3,592,795 the disclosures of which are hereby incorporated by reference, Japanese Patent Publication Nos. 36319/1970, 12154/1971 and 32673/1974, and Japanese Patent Kokai Publication (unexamined) Nos. 156599/1975, 73561/1976, 6098/1979, 13767/1980, 13768/1979, 82123/1980, 123820/1980, 125121/1980, 131021/ 1980, 131022/1980, 135135/1980, 137129/1980, 179210/1982, 191703/ 1983, 78220/1984, 78221/1984, 78222/1984, 78223/1984 and 168014/1984.

The curing agent for the epoxy resin contained in the composition A may be any one of the conventionally used ones. Specific examples of the curing agent are amines (e.g. triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, 2,4,6-tris-(dimethylaminomethyl)-phenol and the like); tert-amine salts; polyamide resins; imidazoles; dicyanediamides; complex compounds of boron trifluoride; carboxylic acid anhydrides (e.g. phthalic anhydride, hexahydrophthalic anhydride, tetrahydrophthalic anhydride, endomethylenetetrahydrophthalic anhydride, dodecinyl succinic anhydride, pyromellitic anhydride, chlorendic anhydride and the like); alcohols; phenols; and carboxylic acids as well as mixtures thereof.

The amount of the curing agent varies with the kinds of the epoxy resin and/or the curing agent. Usually, 0.1 to 300 parts by weight, preferably 0.5 to 100 parts by weight of the curing agent is used based on 100 parts by weight of the epoxy resin contained in the composition B.

The epoxy resin contained in the composition B may be any one of conventionally used ones. Specific examples of the epoxy resin are flame-retardant epoxy resins (e.g. epichlorohydrin-bisphenol A type epoxy resin, epichlorohydrin-bisphenol F type epoxy resin, glycidyl ether of tetrabromobisphenol A and the like), novolak type epoxy resins, hydrogenated bisphenol A type epoxy resins, epoxy resins of the type of glycidyl ether of bisphenol A-propylene oxide adduct, glycidyl p-oxybenzoate type epoxy resin, m-aminophenol type epoxy resins, diaminodiphenylmethane type epoxy resins, urethane modified epoxy resins, alicyclic epoxy resins, glycidyl ether of polyhydric alcohol (e.g. N,N-diglycidylaniline, N,N-diglycidyl-o-toluidine, triglycidylisocyanurate, polyalkyleneglycol diglycidyl ether, glycerin and the like), hydantoin type epoxy resins, epoxidized unsaturated polymer such as petroleum resin, and the like. Among them, those having at least two epoxy groups of the formula:

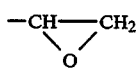

in a molecule are preferable since they are highly reactive during curing and the cured product easily forms a three dimensional network. Most preferable are the bisphenol A type epoxy resins and the novolak type epoxy resins. The epoxy resins may be used independently or as a mixture.

As the curing catalyst for the organic elastomeric polymer having at least one silicon-containing reactive group, any of conventionally used silanol condensation catalysts can be used. Specific examples of the silanol condensation catalyst are titanates (e.g. tetrabutyl titanate and tetrapropyl titanate), tin carbonates (e.g. dibutyltin dilaurate, dibutyltin maleate, dibutyltin diacetate, tin octylate and tin naphthenate), a reaction product of dibutyltin oxide and a phthalate, dibutyltin diacetylacetonate, organic aluminum compounds (e.g. aluminum trisacetylacetonate, aluminum trisethylacetoacetate and diisopropoxyaluminum ethylacetoacetate), chelate compounds (e.g. zirconium tetraacetylacetonate and titanium tetraacetylacetonate), lead octylate, amines (e.g. butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU)) or their salts with carboxylic acids, low molecular weight polyamide resins prepared from excessive polyamine and a polybasic acid, reaction products of excessive polyamine and an epoxy compound, silane coupling agents having an amino group (e.g. γ-aminopropyltrimethoxysilane and N-(β-aminoethyl)aminopropylmethyldimethoxysilane), and other silanol condensation acid or base catalysts. The catalysts may be used independently or as a mixture.

As the acidic filler to be contained in the composition B, any filler can be used insofar as its aqueous dispersion has pH in the acid region. For example, when 10 grams of the filler is dispersed in 100 ml of water, the aqueous dispersion has a pH in the acid region. Specific examples of the acidic filler are titanium dioxide, silica, clay and the like. They may be used as a mixture.

As the carboxylic acid to be contained in the composition B, any carboxylic acid having 1 to 40 carbon atoms in total may be used. Among the carboxylic acids, straight or branched, saturated or unsaturated aliphatic acids are preferable. Particularly preferable are higher fatty acids having 8 to 40 carbon atoms. Specific examples of the higher fatty acids are saturated fatty acids (e.g. caprylic acid, capric-acid, lauric acid, myristic acid, palmitic acid, stearic acid, arachidic acid, behenic acid, lignoceric acid, cerotic acid, montanic acid, melissic acid and the like) and unsaturated fatty acids (e.g. myristoleic acid, palmitoleic acid, oleic acid, linoleic acid, linolenic acid, eicosenoic aid, arachidonic acid and the like). The carboxylic acids may be used as a mixture.

The amounts of the epoxy resin, the curing catalyst for the organic elastomeric polymer and the acidic filler or the carboxylid acid are not critical. Preferably, a weight ratio of the epoxy resin to the organic elastomeric polymer is from 100:1 to 1:100, more preferably from 100:10 to 10:100. When the content of the epoxy resin is too low, the mechanical strength such as modulus of elasticity of the cured material tends to be insufficient. When the content of the epoxy resin is too high, the cured material tends to be brittle.

The amount of the curing catalyst is from 0.1 to 20 parts by weight, preferably from 0.5 to 10 parts by weight based on 100 parts by weight of the organic elastomeric polymer contained in the composition A.

The amount of the acidic filler is from 1 to 500 parts by weight, preferably from 10 to 300 parts by weight based on 100 parts by weight of total amount of the epoxy resin and the organic elastomeric polymer. The content of the acidic filler in the composition B is from 1 to 90% by weight, preferably from 5 to 70% by weight of the composition B. When the amount of the acidic filler is too small, the storage stability of the composition is not satisfactorily improved. When the amount of the acidic filler is too high, the composition is not a liquid and the processability of the composition is deteriorated.

The carboxylic acid is contained in the composition B in an amount of 0.05 to 20% by weight, preferably 0.1 to 10% by weight. When the amount of the carboxylic acid is too low, the storage stability of the composition is not satisfactorily improved. When the amount of the carboxylic acid is too high, the physical properties of the cured material may be deteriorated.

To each of the compositions A and B, fillers may be added. Specific examples of the filler are wood meal, pulp, cotton chip, asbestos, glass fiber, carbon fiber, mica, walnut shell flour, graphite, carbon black, calcium carbonate, talc, magnesium carbonate, quartz powder, aluminum powder, flint powder, zinc powder and mixtures thereof.

When the filler is a neutral or alkaline one, the use of the acidic filler or the carboxylic acid achieves considerable effects. When the additional filler is used in the composition B containing acidic filler, the composition B should contain the acidic filler in an amount of at least 30% by weight, preferably at least 50% by weight.

The total amount of the filler(s) is from 1 to 500 parts by weight, preferably from 10 to 300 parts by weight based on 100 parts by weight of the total weight of the organic elastomeric polymer and the epoxy resin.

The curable composition of the present invention may optionally contain other components such as plasticizers, anti-aging agents, UV light absorbing agents, lubricants, pigments, foaming agents, and the like.

The composition of the present invention may be used in various applications in which the conventional two-pack type curable compositions are used. For example, the composition is formed by a conventional molding method such as compression molding, transfer molding and injection molding to give a molded article having improved impact strength, flexibility and toughness, or a laminated article such as copper-clad laminated board and a laminated lumber. The composition of the present invention can be used as an adhesive with improved peel strength, a foam plastic with improved flexibility, a binding agent for a fiber board or a particle board, a coating, a binding agent for shell molding, a binder of a brake lining, a binder of a grindstone and a matrix resin of a composite material containing glass fiber or carbon fiber. Further, the composition of the present invention can be used for molding a solid rubber such as a natural rubber or a liquid elastomer such as polyurethane. Thereby, a molded elastomeric article and an expanded elastomeric article having improved strength are produced. The composition of the present invention may be used as a sealing agent and a pressure sensitive adhesive.

PREFERRED EMBODIMENTS OF THE INVENTION

The present invention will be illustrated by following Examples, in which "%" and "parts" are by weight unless otherwise indicated.

PREPARATION EXAMPLS 1

Polypropylene glycol having the number average molecular weight of 2500 (90 parts) and polypropylene triol having the number average molecular weight of 3000 (10 parts) were chain extended with methylene chloride according to the method described in U.S. Pat. No. 4,657,986 and molecular ends were capped with allyl chloride to obtain polypropylene oxide 99% of the terminal groups of which were allyl ether groups and which had the number average molecular weight of 8000.

The resulting polypropylene oxide (800 g) and then methyldimethoxysilane (20 g) were charged in an autoclave equipped with a stirrer. After the addition of a solution of chloroplatinic acid (8.9 g of $H_2PtCl_6.6H_2O$ in 18 ml of isopropanol and 160 ml of tetrahydrofurane) (0.40 ml), the reaction was continued at 80° C. for 6 hours while stirring.

An amount of the unreacted hydrosilyl groups in the reaction mixture was monitored by IR spectrum analysis to find that substantially no such group remained. According to determination of the silicon-containing group by NMR, it was confirmed that polypropylene oxide had, at the chain ends, about 1.75 groups of the formula:

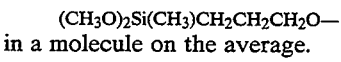

in a molecule on the average.

PREPARATION EXAMPLE 2

Polypropylene glycol having the number average molecular weight of 2000 was chain extended with methylene chloride and capped with allyl chloride to obtain polypropylene oxide 95% of the terminal groups of which were allyl ether groups and which had the number average molecular weight of 5000.

The resulting polypropylene oxide (500 g) and then triethoxysilane (32 g) were charged in the autoclave equipped with stirrer. After the addition of the solution of chloroplatinic acid having the same composition as in Preparation Example 1 (0.40 ml), the reaction was continued at 90° C. for 3 hours.

After removing the excessive triethoxysilane under reduced pressure, an amount of the silicon-containing groups was measured by NMR to confirm that polypropylene oxide had, at the chain end, about 1.8 groups of the formula:

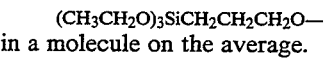

in a molecule on the average.

PREPARATION EXAMPLE 3

Polypropylene glycol having the number average molecular weight of 3000 (300 g) was charged in a flask equipped with a stirrer. Then, tolylenediisocyanate (26 g) and dibutyltin dilaurate (0.2 g) were added and reacted in a nitrogen stream at 100° C. for 5 hours while stirring. Thereafter, γ-aminopropyltriethoxysilane (22.1 g) was added and reacted at 100° C. for 3 hours to obtain a polyether having an average molecular weight of about 6600 and containing terminal triethoxysilane groups and about two silicon-containing reactive groups in a molecule.

PREPARATION EXAMPLE 4

Butyl acrylate (80 g), stearyl methacrylate (20 g), γ-methacryloyloxypropylmethyldimethoxysilane (2.2 g), γ-mercaptopropylmethyldimethoxysilane (1.8 g) and 2,2'-azobis (0.5 g) were homogeneously mixed. Then, the mixture (25 g) was charged in a four-necked 200 ml flask equipped with a stirrer and a condenser and heated to 80° C. on an oil bath while introducing nitrogen gas. Within several minutes, the polymerization was initiated with generating heat. After the heat generation calmed, the rest of the mixture was dropwise added over 3 hours to proceed with the polymerization. After 15 minutes and 30 minutes from the completion of addition of the mixture, azobisisobutyronitrile (each 0.15 g) was added. After the addition of the latter portion of azobisisobutyronitrile, stirring was continued for 30 minutes to complete the polymerization.

The resulting liquid polymer was analyzed by gel permeation chromatograph (GPC) to find that the polymer had the number average molecular weight of about 10,000.

EXAMPLE 1 AND COMPARATIVE EXAMPLE 1

PREPARATION OF THE FIRST COMPOSITION A

The polymer prepared in Preparation Example 1 (100 parts), 2,2'-methylene-bis-(4-methyl-6-tert.-butylphenol) (1 part), N-β-(aminoethyl)-γ-aminopropyltrimethoxysilane (1 part), vinyltrimethoxysilane (3 parts), ground calcium carbonate (46 parts) and 2,4,6-tris(dimethylaminomethyl)phenol (5 parts) were thoroughly mixed with a three-roll paint mill to prepare a composition.

PREPARATION OF THE SECOND COMPOSITION B

Bisphenol A type epoxy resin (Epikote 828 (trade name) manufactured by Yuka Shell Epoxy Co., Ltd.) (50 parts), ground calcium carbonate (25 parts), #918 (an organic tin compound manufactured by Sankyo Organic Synthesis) (1 part) and Aerosil R-202 (manufactured by Nippon Aerosil) (2 parts) were thoroughly mixed with the three-roll paint mill to prepare a composition.

Each of the compositions A and B was stored in a respective sealed glass bottle at 50° C. for one month. Then, the composition A (20 g) and the composition B (10 g) were mixed and cured at 23° C., 50 %RH and a surface hardening time (tack free time with finger touching, namely a time in which surface tackiness disappeared) was measured.

For comparison, a composition B in which Aerosil was not used was prepared and used.

The results are shown in Table 1.

TABLE 1

|  | Example No. | |
| --- | --- | --- |
|  | 1 | Comp. 1 |
| Tack free time (Hrs) | | |
| Before storage | 4.3 | 3.3 |
| After storage | 3.8 | 3.5 |
| Adhesion strength | | |
| Tensile shear strength (kg/cm$^2$) | | |
| Before storage | 65 | 61 |
| After storage | 66 | 35 |
| T-shape peeling strength (kg/25 mm) | | |
| Before storage | 5.4 | 5.9 |
| After storage | 5.7 | 2.1 |

As is seen from the results of Table 1, addition of Aerosil R-202 improved the storage stability greatly.

According to the procedures of JIS K 6850 and JIS K 6854, the adhesive properties (tensile shear strength and T-shape peeling strength) of the composition was evaluated with a mixture of the composition A (40 g) and the composition B (20 g) both prepared in Example 1.

TENSILE SHEAR STRENGTH

On an aluminum plate (according to JIS H 4000. A-1050P. 100 mm×25 mm×2.0 mm), the above mixture was coated in a thickness of about 0.5 nun. A pair of the same plates coated with the mixture were laminated with facing the coated surfaces to each other and pressed by hand. The laminated plates were kept at 23° C. for two days and then aged at 50° C. for three days and peeled off at a pulling rate of 50 nun/min. to measure the tensile shear strength.

T-SHAPE PEELING STRENGTH

On an aluminum plate (according to JIS H 4000. A-1050P. 200 mm×25 mm×0.1 mm), the above mixture was coated in a thickness of about 0.5 mm. A pair of the same plates coated with the mixture were laminated with facing the coated surfaces to each other and pressed five times by moving a hand roller with 5 kg of load along the length in one direction. The laminated plates were kept at 23° C. for two days and then aged at 50° C. for three days and peeled off at a pulling rate of 200 mm/min. to measure the T-shape peeling strength.

The results are also shown in Table 1. In Comparative Example 1, the adhesive strength was decreased, while in Example 1, the adhesive strength before and after storage was substantially the same.

EXAMPLES 2-7

In the same manner as in Example 1 but using an acidic filler shown in Table 2 in place of Aerosil R-202 in the composition B, the compositions A and B were prepared and subjected to the storage test, and the tack free time was measured.

The results are shown in Table 2.

TABLE 2

| Example No. | Acidic filler in composition B (parts) | Tack free time (Hrs) | |
| --- | --- | --- | --- |
|  |  | Before storage | After storage |
| 2 | Aerosil R-202 (1) | 3.8 | 4.3 |
| 3 | Aerosil 200*[1] (2) | 4.1 | 4.7 |
| 4 | Titanium oxide (5) | 2.3 | 4.1 |
| 5 | Titanium oxide (10) | 3.1 | 3.5 |
| 6 | Kaolin clay (5) | 2.5 | 5.4 |
| 7 | Kaolin clay (10) | 2.9 | 4.6 |

Note
*[1] Silicic anhydride manufactured by Nippon Aerosil.

EXAMPLES 8-10

In the same manner as in Example 1 but using the polymer prepared in Preparation Example 2, 3 or 4 in place of the polymer prepared in Preparation Example 1 in the composition A, the compositions A and B were prepared and subjected to the storage test, and the tack free time was measured.

The results are shown in Table 3.

TABLE 3

| Example No | Polymer in composition A (parts) | Tack free time (Hrs) | |
| --- | --- | --- | --- |
|  |  | Before storage | After storage |
| 8 | Prep. Ex. 2 (100) | 4.2 | 3.5 |
| 9 | Prep. Ex. 3 (100) | 3.9 | 3.7 |
| 10 | Prep. Ex. 4 (40) Prep. Ex. 1 (60) | 4.5 | 3.8 |

EXAMPLE 11 AND COMPARATIVE EXAMPLE 2

PREPARATION OF THE FIRST COMPOSITION A

The polymer prepared in Preparation Example 1 (100 parts), 2,2'-methylene-bis(4-methyl-6-tert.-butylphenol) (1 part), N-β-(aminoethyl)-γ-aminopropyltrimethoxysilane (1 part), vinyltrimethoxysilane (3 parts), ground calcium carbonate (48 parts) and 2,4,6-tris(dimethylaminomethyl)phenol (5 parts) were thoroughly mixed with a three-roll paint mill to prepare a compound.

PREPARATION OF THE SECOND COMPOSITION B

Bisphenol A type epoxy resin (Epikote 828 (trade name) manufactured by Yuka Shell Epoxy Co., Ltd.) (50 parts), ground calcium carbonate (25 parts), #918 (an organic tin compound manufactured by Sankyo Organic Synthesis) (1 part) and stearic acid (3 parts) were thoroughly mixed with the three-roll paint mill to prepare a compound.

Each of the compositions A and B was stored in a respective sealed glass bottle at 50° C. for one month. Then, the composition A (20 g) and the composition B (10 g) were mixed and cured at 23° C., 50 %RH and a surface hardening time was measured.

For Comparison, a composition B in which stearic acid was not used was prepared and used.

The adhesion strength of the composition was evaluated in the same manner as in Example 1 according to JIS K 6850 and K 6854.

The results are shown in Table 4.

TABLE 4

|  | Example No. | |
| --- | --- | --- |
|  | 11 | Comp. 2 |
| Tack free time (Hrs) | | |
| Before storage | 4.5 | 3 |
| After storage | 2.9 | 32 |

TABLE 4-continued

| | Example No. | |
|---|---|---|
| | 11 | Comp. 2 |
| Adhesion strength | | |
| Tensile shear strength (kg/cm²) | | |
| Before storage | 62 | 60 |
| After storage | 63 | 32 |
| T-shape peeling strength (kg/25 mm) | | |
| Before storage | 5.8 | 5.9 |
| After storage | 5.5 | 1.9 |

In Example 11, there was no difference in the adhesion strength before and after storage, while in Comparative Example 2, the adhesion strength decreased after storage.

EXAMPLES 12–17

In the same manner as in Example 11 but using the carboxylic acid shown in Table 5, the compositions A and B were prepared and subjected to the storage test, and the tack free time was measured.

TABLE 5

| Example No. | Carboxylic acid in composition B (parts) | Tack free time (Hrs) | |
|---|---|---|---|
| | | Before storage | After storage |
| 12 | Stearic acid (1) | 3.8 | 4.9 |
| 13 | Stearic acid (5) | 5.6 | 2.7 |
| 14 | Octylic acid (3) | 4.8 | 2.2 |
| 15 | Lauric acid (3) | 4.7 | 3.3 |
| 16 | Oleic acid (5) | 4.3 | 3.1 |
| 17 | Linolic acid (5) | 4.5 | 2.8 |

EXAMPLES 18–20

In the same manner as in Example 11 but using the polymer prepare in Preparation Example 2, 3 or 4 in place of the polymer prepared in Preparation Example 1 in the composition A, the compositions A and B were prepared and subjected to the storage test, and the tack free time was measured.

The results are shown in Table 6.

TABLE 6

| Example No. | Polymer in composition A (parts) | Tack free time (Hrs) | |
|---|---|---|---|
| | | Before storage | After storage |
| 18 | Prep. Ex. 2 (100) | 4.3 | 3.5 |
| 19 | Prep. Ex. 3 (100) | 3.8 | 2.7 |
| 20 | Prep. Ex. 4 (40) Prep. Ex. 1 (60) | 4.7 | 3.2 |

What is claimed is:

1. A two-pack type curable composition comprising: a first composition containing (A-1) an organic elastomeric polymer having at least one silicon-containing group to the silicon atom of which a hydroxyl group and/or a hydrolyzable group are bonded and which is cross linkable through formation of a siloxane linkage in a molecule, 2,4,6-tris-(dimethylaminomethyl)phenol as a curing agent for an epoxy resin and (A-3) calcium carbonate, and B. a second composition containing (B-1) an epoxy resin, (B-2) a curing catalyst for the organic elastomeric polymer having at least one silicon-containing reactive group and (B-3) a mixture of calcium carbonate and at least one carboxylic acid.

2. The two-pack type curable composition according to claim 1, wherein said silicon-containing group is represented by the formula:

$$X_a-\underset{\underset{X_b}{|}}{\overset{\overset{R^1_{3-a}}{|}}{Si}}-(-O-\underset{\underset{}{|}}{\overset{\overset{R^1_{2-b}}{|}}{Si}})_m- \quad (I)$$

wherein X is a hydroxyl group or a hydrolyzable group, $R^1$ is a monovalent hydrocarbon group having 1 to 20 carbon atoms or a triorganosiloxy group of the formula: $R^2_3-Si-O-$ in which $R^2$ is a monovalent hydrocarbon group having 1 to 20 carbon atoms, "a" is 0, 1, 2 or 3, "b" is 0, 1 or 2 provided, that the total of "a" and "b" is at least 1 and "m" is 0 or an integer of 1 to 19, provided that when two or more $R^1$ groups are present, they may be the same or different, that when two or more X moieties are present, they may be the same or different, that when two or more bracketed groups are present, they may be the same or different, and "b" may be the same or different when "m" is two or more.

3. The two-pack type curable composition according to claim 1, wherein said silicon-containing group is a group of the formula:

$$-\underset{\underset{}{|}}{\overset{\overset{R^1_{3-c}}{|}}{Si}}-X_c \quad (II)$$

wherein $R^1$ and X are the same as defined above, and "c" is 1, 2 or 3.

4. The two-pack type curable composition according to claim 2, wherein the hydrolyzable group is an alkoxy group.

5. The two-pack type curable composition according to claim 1, wherein the organic elastomeric polymer comprises a backbone of a polyether.

6. The two-pack type curable composition according to claim 5, wherein the organic elastomeric polymer comprises a backbone of polypropylene oxide.

7. The two-pack type curable composition according to claim 1, wherein the organic elastomeric polymer comprises a backbone of polyalkyl acrylate.

8. The two-pack type curable composition according to claim 1, wherein the epoxy resin is at least one selected from a bisphenol-A type epoxy resin and a novolak type epoxy resin.

9. The two-pack type curable composition according to claim 1, further comprising an acidic filler which is at least one selected from the group consisting of titanium oxide and clay.

10. The two-pack type curable composition according to claim 1, wherein the carboxylic acid is a higher fatty acid having 8 to 40 carbon atoms.

11. The two-pack type curable composition according to claim 2, wherein the total of "a" and "b" is from 1 to 4.

* * * * *